US008473861B2

(12) United States Patent
Stringer et al.

(10) Patent No.: US 8,473,861 B2
(45) Date of Patent: Jun. 25, 2013

(54) SYSTEM WIDE TEXT VIEWER

(75) Inventors: Anthony Bowman Stringer, Tarpon Springs, FL (US); Garald Lee Voorhees, Tampa, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 251 days.

(21) Appl. No.: 12/817,689

(22) Filed: Jun. 17, 2010

(65) Prior Publication Data
US 2011/0314414 A1 Dec. 22, 2011

(51) Int. Cl.
*G06F 3/048* (2006.01)

(52) U.S. Cl.
USPC .......................................................... 715/785

(58) Field of Classification Search
USPC .................. 715/785, 711, 801, 866; 434/178, 434/179, 180, 181, 182, 183, 184
See application file for complete search history.

(56) References Cited

U.S. PATENT DOCUMENTS

| 5,696,530 A | 12/1997 | Maejima |
| 5,754,348 A | 5/1998 | Soohoo |
| 6,288,702 B1 | 9/2001 | Tachibana et al. |
| 6,704,034 B1 | 3/2004 | Rodriguez et al. |
| 6,956,979 B2 | 10/2005 | Janakiraman et al. |
| 6,970,181 B1 * | 11/2005 | Fadel ........................ 348/14.01 |
| 7,212,210 B2 * | 5/2007 | Cooper ........................ 345/472 |
| 7,296,230 B2 * | 11/2007 | Fukatsu et al. ................. 715/711 |
| 7,353,459 B2 | 4/2008 | Barbanson et al. |
| 7,389,477 B2 * | 6/2008 | Barbanson et al. ........... 715/791 |
| 7,653,896 B2 * | 1/2010 | Herdeg, III .................... 717/113 |
| 7,694,234 B2 * | 4/2010 | Fleisher et al. ................ 715/801 |
| 7,712,046 B2 * | 5/2010 | Ngari et al. .................... 715/801 |
| 7,900,158 B2 * | 3/2011 | Ngari et al. .................... 715/801 |
| 7,949,955 B2 * | 5/2011 | Winser et al. ................. 715/801 |
| 2002/0078084 A1 * | 6/2002 | Konttinen .................. 707/501.1 |

(Continued)

FOREIGN PATENT DOCUMENTS

| JP | 2007-79947 A | 3/2007 |
| KR | 10-2007-0107462 A | 11/2007 |
| WO | 2007003994 A1 | 1/2007 |

OTHER PUBLICATIONS

Stinson, Craig, Running Microsoft Windows 98, 1998, Microsoft Press, pp. 314-317.*

(Continued)

*Primary Examiner* — Stephen Hong
*Assistant Examiner* — James G Pohlman
(74) *Attorney, Agent, or Firm* — Anton J. Hopen; Andriy Lyivyn; Smith & Hopen, P.A.

(57) ABSTRACT

A method of magnifying text across a computer operating system platform, the method including the steps of loading a background text viewer process on a computer operating system, the background text viewer process having access to internal operating system messaging relating to text sent to a graphics display driver for presentation to an end-user on a GUI, drawing a text viewer on a portion of the GUI whereby the text viewer and a third party application that displays text are shown on the GUI concurrently, intercepting text originating from the third party application and sent to the graphics display driver, the interception performed by the background text viewer process, selecting a substring of intercepted text associated with an end-user focus on the third party application and displaying the substring on the text viewer according to end-user defined settings.

19 Claims, 9 Drawing Sheets

U.S. PATENT DOCUMENTS

| | | | | |
|---|---|---|---|---|
| 2003/0025715 A1* | 2/2003 | Graham et al. | ............... | 345/660 |
| 2006/0227153 A1 | 10/2006 | Anwar et al. | | |
| 2007/0192718 A1 | 8/2007 | Voorhees et al. | | |
| 2010/0083192 A1* | 4/2010 | Zaman et al. | ................. | 715/866 |
| 2010/0235736 A1* | 9/2010 | Fleisher et al. | ............... | 715/702 |

OTHER PUBLICATIONS

Lunar Screen Magnifier version 8.0, 1998, Dolphin Oceanic Ltd.*

Microsoft Internet Explorer 8 Help—IE Language Settings, Mar. 19, 2009, p. 1.*

Vertical Writing east Asian Script, http://web.archive.org/web/20090216233711/http://en.wikipedia.org/wiki/Horizontal_and_vertical_writing_in_East_Asian_scripts, Feb. 16, 2009, pp. 8-9.*

International Search Report for PCT/US2011/040703 dated Dec. 28, 2011 from the International Searching Authority.

International Preliminary Report on Patentability for International application No. PCT/US2011/040703, filing date of Jun. 16, 2011, mailed on Jan. 3, 2013.

* cited by examiner

SYSTEM WIDE TEXT VIEWER

FIELD OF INVENTION

This invention relates to low vision assistive technology, and more specifically, to a text viewer for a computer display.

BACKGROUND OF THE INVENTION

Individuals with vision difficulties often have problems reading text on computer screens. Modifications in text color, font or size often improve the readability of text for these individuals. Various types of technologies assist in providing these modifications including screen magnifiers and document readers. Screen magnifiers typically interface with a computer's graphical output to present enlarged screen content across any application loaded onto a computer's operating system. Document readers are applications that load in computer files and can present the alphanumeric characters in various formats to assist the low vision user.

What is needed in the art is a new technology that can present normalized text in a consistent fashion from any active software process on the operating system without having to load files into a document reader.

SUMMARY OF INVENTION

The present invention relates to a method of magnifying text across a computer operating system platform. The background text view process is loaded on a computer operating system such as MICROSOFT WINDOWS. The process may reside in the background as a service application, whereby a user interface or dialog box relating to the process is not necessarily visible at all times. The process may also be integrated with an existing application such as the screen magnification software sold under the brand MAGIC® by Freedom Scientific in St. Petersburg, Fla. The background text viewer process has access to internal operating system messaging relating to text sent to and from a graphic display driver for presentation to an end-user on a graphic user interface (GUI). With screen reading or screen magnification software, assistive technology vendors (ATVs) essentially locate the display driver, get the information needed for it, then pass the sometimes modified Display Driver Interface (DDI) calls to the original display driver. The DDI interception technique is called driver chaining and is known by those of ordinary skill in the art.

By communicating with the DDI, text may be intercepted, read, modified and redisplayed in alternative form. In the present invention, a text viewer is drawn on a portion of the GUI. The text viewer is a display surface that shows the text of the PC focus in user-selectable colors and text attributes. For the purposes of this disclosure PC focus is defined as the area on the graphic user interface at, or in proximity to the GUI coordinates where the user has positioned a caret, cursor or some other graphic indicia whether by keyboard, mouse, touch screen or other means. This can be distinguished from active focus in which a GUI component can have an "active focus" state which facilitates the usability of the component. For example, a first textbox on a GUI which is in "active focus" will accept text input while a second textbox on the GUI will not receive text input until it is switched to "active focus," typically by a TAB-keystroke, mouse down event or by an automated switching of focus. Thus "active focus" relates to the state of a component in a graphic user interface to accept user input (typically keyboard input) while "PC focus" relates to an area defined by the proximity of a caret, cursor or some other graphic indicia that presumptively is of interest to the end user. In an embodiment of the invention, the text viewer is separate from the desktop, in that the viewer is never magnified. Instead, the user adjusts its height based on choices of font, font size, and font attributes.

The text viewer may form a horizontal rectangle at the top edge or lower edge of the computer display screen. The horizontal format is optimal for text that is read on a horizontal plane such as English. Alternatively, the text viewer may form a vertical rectangle at the far left edge or far right edge of a computer display screen. The vertical format would be optimal for text that is read on a vertical plane such as Mandarin Chinese. As shown in FIG. 4, additional steps to the invention include detecting language type 230 and then determining viewer orientation 240 to support vertically read languages.

In an implementation of the invention, the text viewer window is located at the top of the screen. The text viewer displays a single line of text and no title bar. It automatically resizes based on the end user's selected font size and attributes. The desktop is not obscured by the text viewer. Rather the desktop is projected downward creating no overlap with the text viewer. The portion of the desktop that is thusly no longer visible is accessible to the user via panning. While the desktop is subject to magnification the text viewer is not.

Text generated by the operating system or by another program separate from the background text view process (collectively, third party applications) and sent to the graphic display driver is intercepted by the background text viewer process. On the text viewer GUI, the source of the text currently displayed in the text viewer is identified.

A focus displayed on a GUI screen allows the end user to identify a given GUI component on the GUI screen selected using input units such as a keyboard or a mouse. This focus is a visual indication showing an area on a GUI screen to which the end user is currently referring and is represented, for instance, by a dotted box enclosing the GUI component currently being referred to.

A GUI screen control system controls the focus so that the focus moves from one area to another on the GUI screen in response to operations indicating a direction such as up, down, right, or left on a mouse or keyboard. When the user presses a button or a key indicating confirmation, the GUI screen control system recognizes a GUI component that is focused on at that point as having been selected by the user and controls the processing according to the properties of the selected GUI component.

End user focus may also include, in addition to GUI user controls such as buttons and text boxes, the location of the mouse pointer and cursor. For example, while navigating between user controls in MICROSOFT WINDOWS, the tab button on a keyboard will jump from one control to the next control. Most controls, but not all, will have associated text that is intercepted by the present invention at the operating system level (i.e., graphics display driver). In addition, an end user may sweep the mouse pointer across a page of text which is also intercepted as well. Finally, an end user may navigate through a document using the arrows on a keyboard, text on the line in which the end user navigates the cursor is intercepted.

The intercepted text is displayed on the text viewer. However, in most instances, a substring of the intercepted text rather than all the text is typically displayed, as the intercepted text may be substantially larger than what appears normally within the GUI and the entire intercepted and enlarged text would not fit within the text viewer.

It is important to note that the text viewer is independent of any third party applications. In other words, the text viewer is not integrated into a proprietary document viewer whereby the end user must load a document into a specific application. To the contrary, virtually any text that is output to the GUI including application content, user controls such as buttons, listviews, textboxes and the like are displayable on the text viewer.

An embodiment of the invention includes the additional step of providing bi-directional synchronization of the end-user focus in the GUI and the intercepted text displayed on the text viewer, whereby change in end-user focus in the GUI updates the text viewer and scrolling of the text viewer updates the location of the end-user focus in the GUI.

In yet another embodiment of the invention, an additional step includes providing a panning function, the panning function further includes the steps of (responsive to a first user input) uncoupling the bi-directional synchronization, panning across text displayed on the text viewer whereby the end-user focus in the GUI remains static, and (responsive to a second user input) re-coupling the bi-directional synchronization. Panning may be restricted to a single line of text in the GUI, or may automatically continue to the next or previous line of text, dependent on panning direction.

An embodiment of the invention establishes a desktop region separate from the text viewer, where the desktop region displays operating system elements and third-party applications subject to end-user specified magnification, while the text viewer is not subject to magnification. The text viewer is resized according to end-user specified font attributes of the text displayed therein. For example, a horizontally oriented text viewer set to fifty (50) point type would have greater height than one set to twenty (20) point type.

Another embodiment of the invention includes the step of placing a text source graphic displayed within the text viewer, the text source graphic indicating the source of the end-user focus resulting in the current line of text displayed within the text viewer. The end-user focus may include, but is not limited to, mouse pointer position, cursor position, caret position, screen reader position, Braille reader position, and docked text viewer position.

Directional indicia may be displayed on the text viewer to indicate to the end user that additional text is available. These may include indicia such as arrows that point left and/or right (for horizontally-read languages). Alternatively, indicia may include more subtle feedback such as color or shading gradients within the text viewer itself. For example, as an end user approaches the end of a text line, the background gradient color blends to gray.

There are different methods of scrolling and positioning text in the text viewer during automated speech or during user navigation via panning. Scrolling methods according to the present invention are supported when the cursor indicator or spotlight (for screen magnification) needs to position itself on a currently off-screen character/word, or when special positioning is mandated by the user's choice of scrolling methods.

The first method is book reading mode. In this mode, the entire visible portion of text (i.e., text "run") is scrolled, and the cursor/spotlight are positioned at the opposite end of the side that caused the scroll. For example, if moving the cursor or spotlight towards the right edge of the text viewer, upon reaching the edge the cursor/spotlight jump to the left edge and the text is scrolled by the full width of the text viewer. When moving left and reaching the left edge, the cursor/spotlight jump to the right edge and the text is scrolled to the right.

The second method is ticker tape mode. In this mode, the cursor is in a user-defined, fixed position within the text viewer and the text is scrolled in the same increments as the user's navigation (letter, word, line, etc.). While in ticker tape mode, a flowing configuration may be employed, wherein the cursor moves across a text run and, upon reaching the edge, additional text of the current line will flow in, a character or word at a time. Alternatively, in a centered configuration the cursor/spotlight are centered and anchored in the text viewer and the text scrolls, rather than the cursor indictor/spotlight moving. In yet another alternative embodiment, a right configuration makes the cursor bound to the right edge of the text viewer. Finally, in single word configuration the current line of text only shows a single word of text in the current line. This is most useful for users with visual ordering challenges such as Dyslexia.

The present invention may hide repeated spaces. When this function is activated, any number of spaces greater than or equal to an end user specified value are removed from the text rendered in the text viewer. Another function may be activated to create compact text. This function removes all whitespace, line feeds, paragraph breaks and the like. It renders an entire document into a contiguous chain of sentences.

An embodiment of the invention includes a text source graphic display within the text viewer. This includes the step of applying indicia within the GUI to identify text already presented within the text viewer. For example, a graphic region on the left edge of the text viewer displays an I-beam, monitor or keyboard image to indicate text sourced from the GUI. A mouse image may indicate text sourced from a line closest to the mouse pointer. Another image may indicate text sourced from the text viewer itself. Finally, another image may indicate text sourced from an extrinsic source such as a virtual PC implementation such as JAWS sold by Freedom Scientific.

Yet another embodiment of the invention includes an automatic panning function ("say all" function). The automatically scrolls text in the GUI to the text viewer responsive to a user-input event such as a keystroke combination. It is important to note that output to the text viewer (whether in automatic panning mode or not) may be synchronized with output to a speech engine, Braille display or other output means.

The invention may be deployed via a number of methods including, but not limited to compact disc, digital versatile disc (DVD), OEM installation, portable flash drives, downloads and the like. These delivery methods provide a non-transitory computer-readable medium having stored thereon a program which is executable by a processor. Intercepting text messages between the operating system, third party applications and the graphic display driver under the present invention results in a substantial transformation of both the text itself (normalized for display on the text viewer) in addition to a substantial transformation of the graphics user interface experienced by the end user.

An advantage of the present invention is its ability to display text in singular context independent of the native application from which the text originates.

Another advantage of the present invention is that it provides consistent user-defined text attributes including font face, size and modifiers, each independent of the native application's display settings.

Yet another advantage of the present invention is that it provides the ability to simultaneously view text in its original application context in addition to that of the text viewer.

Yet another advantage of the present invention is that it provides a centralized area of focus for the end user which removes the need to "hunt and pan" to view text-based content when magnified.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The text viewer is a display surface that shows the text of the active PC focus or text in close proximity to the mouse in user-selectable colors and text attributes. The text viewer is separate from the desktop, in that it is never magnified; instead, the user adjusts its height based on choices of font, font size, and font attributes.

Key features of an embodiment of the text viewer include: (1) the desktop is not obscured by text viewer; (2) the user is able to configure the text viewer's appearance and display attributes; e.g. colors, font, etc.; (3) the cursor position is shown in viewer window; (4) spotlighting is enabled during automated reading; (5) user-selectable text scrolling methods are provided; and (6) text panning is provided.

In one embodiment, the text viewer window is located at the top of screen. The display has a single line of text and no title bar, and automatically resizes vertically based on the user's selected font size and attributes.

To accommodate the space requirements of the text viewer, the desktop's rendering is repositioned vertically. The text viewer display is "user passive", in that it is not directly accessible via input devices, other than the keyboard accelerators used for panning. The mouse is never allowed into the text viewer display area in an embodiment of the invention.

Figure 1:
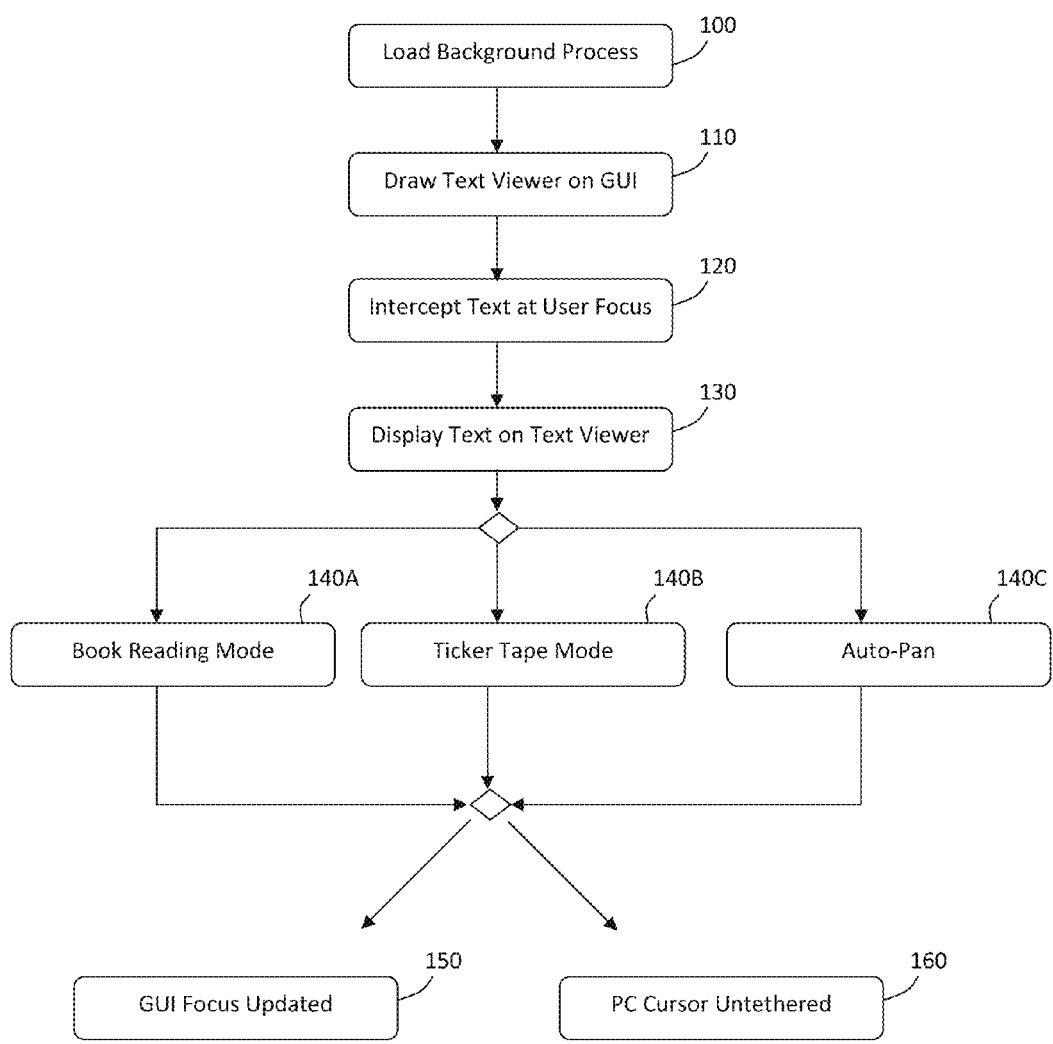
FIG. 1 is a diagrammatic view of an embodiment of the invention.

Turning to FIG. 1, as a method, an embodiment of the invention includes the steps of loading a background process 100 on a computer operating system. A text viewer is drawn on the GUI 110. Text at the user focus is intercepted 120 via operating system messaging and displayed 130 on the text viewer. Text may be handled on the text viewer by various methods including book reading mode 140A, ticker tape mode 140B and auto-panning 140C. As text is displayed in the text viewer, the GUI focus may be updated 150 or, alternatively, the PC cursor may be untethered 160. For example, a user may position the PC cursor near an area of text to be read and sets the text viewer to auto-panning 140C. The user watches the text pan across the text viewer at a predetermined rate (i.e., faster for skim-reading and slower for comprehension reading). Assuming the text viewer is docked at the top of the screen, the GUI below the text viewer may or may not be updated depending on whether the GUI focus is updated 150 or whether the PC cursor is untethered 160. If the PC cursor is untethered 160, then the PC cursor is left where the user placed it when auto-panning 140C was initiated. This may be desirable in some instances. However, a drawback is that once the user is finishing with the auto-panning 140C then he or she may not know where on the GUI the reading stopped. Alternatively, if the GUI focus is updated 150 in synchronization with the auto-pan 140C feature then the GUI position is constantly updated as the user reads the text panned across the text viewer. When the user is done with the auto-panning 140C feature and looked down at the GUI, the PC cursor is located at the position of text where the auto-panning feature stopped. This helps keep the reading position in the right context for the user.

Figure 2:
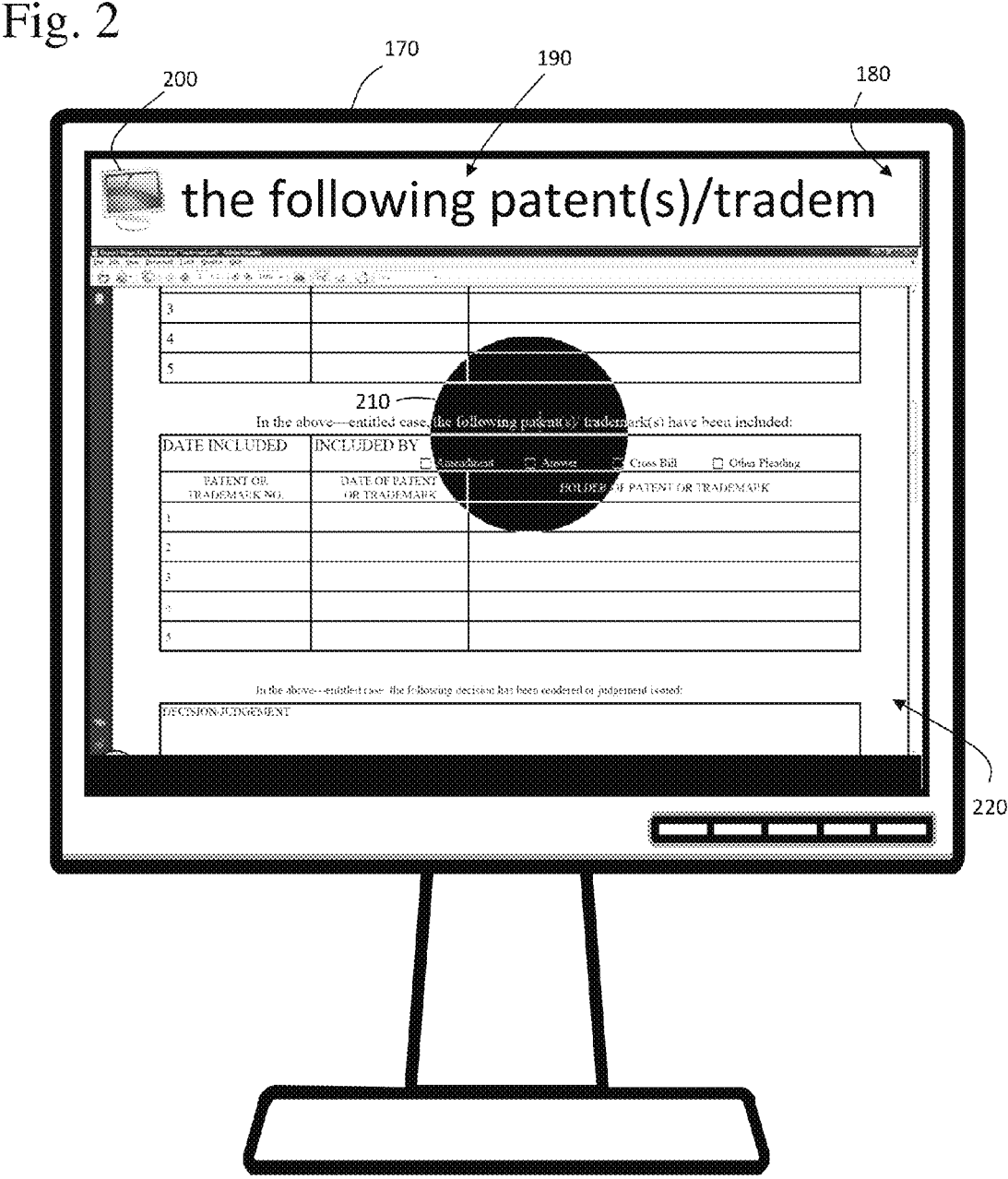
FIG. 2 is a GUI computer screen display according to an embodiment of the invention.
Figure 3:
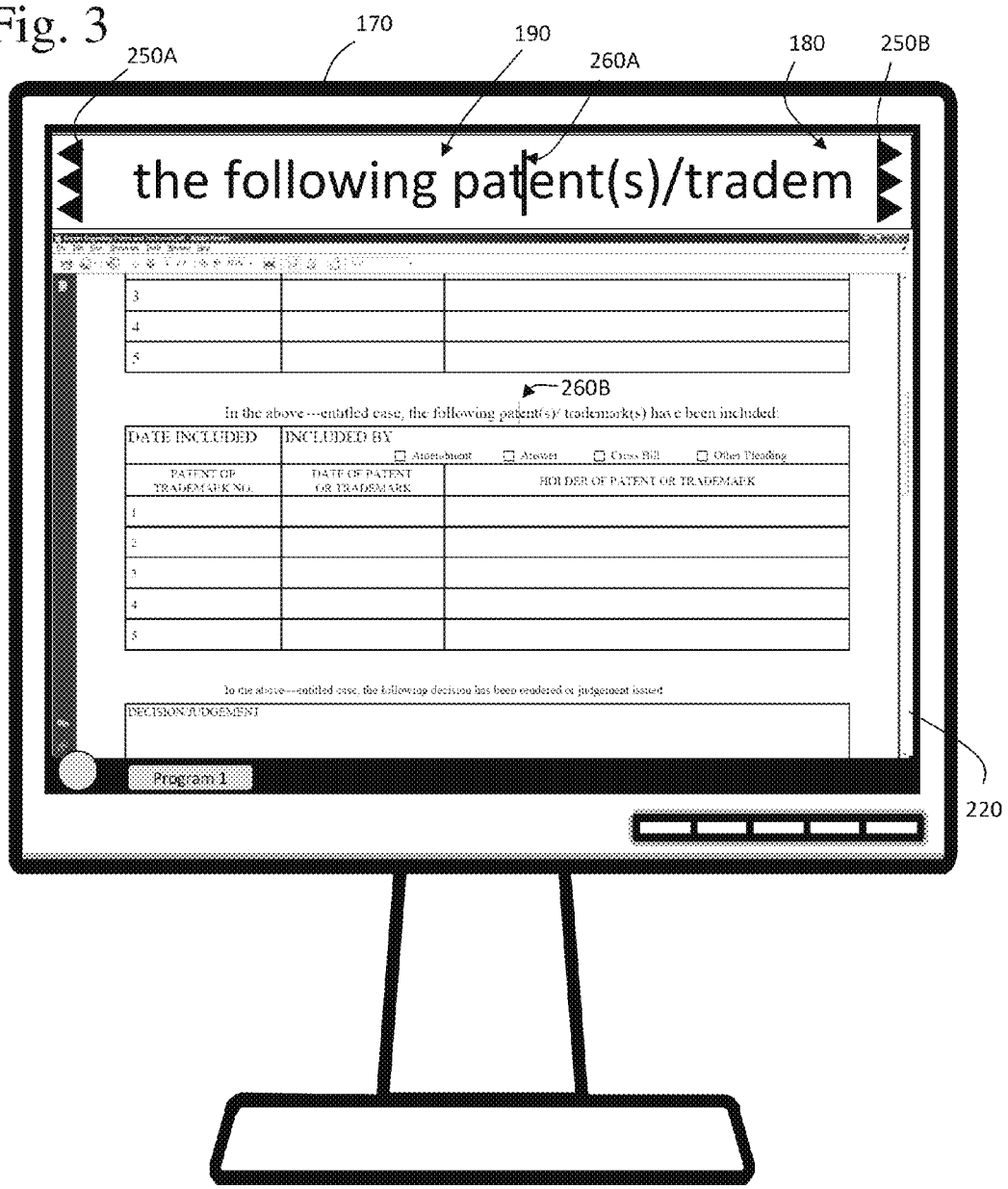
FIG. 3 is a GUI computer screen display according to an embodiment of the invention.
Figure 4:
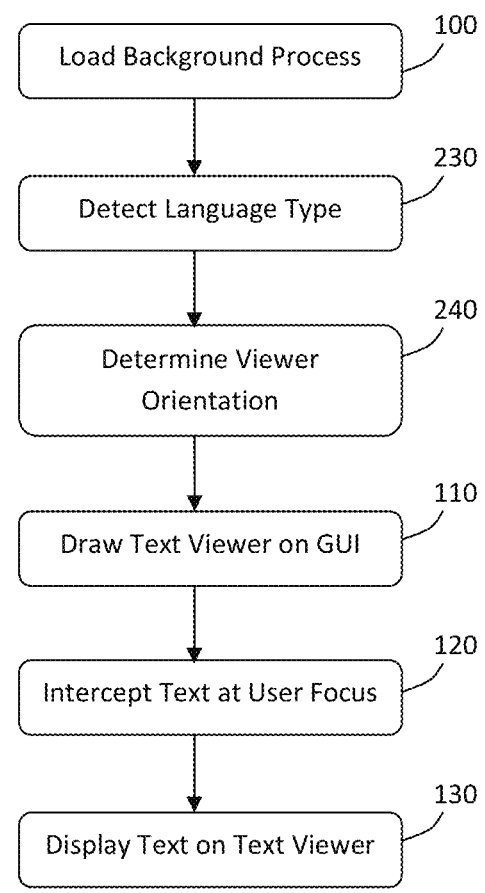
FIG. 4 is a diagrammatic view of an embodiment of the invention that accommodates vertically read languages.
Figure 5:
FIG. 5 is a GUI computer screen display dialog box according to an embodiment of the invention.

The anatomy of this embodiment of the text viewer is as follows:

Text Region—As shown in FIGS. 2-3, this is the text display area 180 that shows the current line of text 190 on a computer monitor 170. Text display area 180 is typically presented above the GUI 220. Various visual modifications may take place in GUI 220 including, but not limited to, magnification, contrast modifications, hue changes and the like. An inverted spotlight 210 may be centered on the user focus on GUI 220 which corresponds to the position of the text on text display area 180.

Text Source Graphic—Graphic region 200 indicates the source of the current line of text (currently displaying the monitor image). Examples of possible values are:
 a. "PC" (signified by an I-Beam, monitor, or keyboard image)
 b. "Mouse" (signified by a mouse image)
 c. "Textviewer" (signified by a graphic)
 d. "JAWS/Virtual PC" (signified by a graphic)

For example, if the user is on a text document and is moving around with the cursor the text viewer would display the PC Cursor icon, since the contents of the text viewer would be the text on the current line in the document. If the user then pointed at their clock icon on the taskbar the text in the text viewer could change to show "10:45 AM" and the icon shown would be that of the mouse. If the user then pressed the left arrow key the PC cursor would move in the document (remember, the mouse never clicked on the clock—just pointed at it to generate the mouse speech of "10:45 AM"). Because the last event that the text viewer now sees is one that is generated via the PC cursor, the text viewer changes its icon to the PC cursor and again shows the contents of the current line of text in the document. In summary, the text viewer graphic, along with its textual content, are derived from the source of the last text event. It should be noted that the text source graphic may be implemented as any graphic indicia to show the source of the last text event. It may be a bitmap graphic, a text put, a row, a color change, font stylization change or the like.

An alternative embodiment of the invention includes a first text viewer canvas for the PC cursor and a second text viewer canvas for other text sources. The second text viewer canvas may be hidden or viewable depending on what non-PC cursor text is available. For example, the second text viewer canvas may slide up and under the first text viewer canvas after mouse-originated text has been displayed for a predetermined time period.

Edge Indicators—As shown in FIG. 3, indicators 250A-B show when there is additional text available to the left or right of the currently visible portion of the current line. Line breaks or text wrapping determine the text string on each line. This region may also be modified based on panning ability. Cursor position 260A in text display area 180 corresponds to user focus 260B in GUI 220.

The text viewer can be activated via the tools menu, popup menu, through the text viewer settings property sheet, or by any other appropriate mechanism. (FIGS. 5-8).

The text viewer may be a feature of a magnification application such as Freedom Scientific's MAGic® and its display will be populated with text from the speech engine. The text of the active cursor is written to the window.

There are different methods of scrolling and positioning text in the text viewer during automated speech or during user navigation via panning. The following scrolling methods are supported when the cursor indicator or spotlight needs to position itself on a currently off-screen character or word, or when special positioning is mandated by the user's choice of scrolling methods:

"Book Reading" Method: the entire visible portion of text (aka, the text "run") is scrolled, and the cursor/spotlight are positioned at the opposite end of the side that caused the scroll. For example, when the cursor or spotlight is moving toward the right edge of the text viewer, upon reaching the edge the cursor/spotlight will jump to the left edge and the text will be scrolled by the full width of the text viewer. When moving left and reaching the left edge, the cursor/spotlight will jump to the right edge and the text will be scrolled to the right.

"Ticker Tape" Method: The cursor is in a fixed, user-defined position and the text is scrolled in the same increments as the user's navigation (letter, word, line, etc.) Movement of text in the text viewer under this method may be controlled by the PC focus (operated by the end user) or may be automated to a predefined rate to enable skimming or comprehension as desired by the end user.

The user can pan text in the text viewer via hotkey (such as Ctrl+Shift+Windows+Arrow). Panning is independent of the last active cursor position, unless otherwise specified in the settings dialog. Additionally, the user can restrict panning to the current line of text through the settings dialog.

The text viewer will show the current line of text based on the most recent position of the active cursor. If the user moves the PC or mouse cursor and the text at the cursor is already showing in the viewer, the text viewer cursor indicator will move to the correct position, but the line will not be scrolled.

As the PC or mouse focus moves to menus and controls, the text of the currently selected menu item or control will be displayed in the viewer window. For menus and menu items, the cursor position indicator will be on the mnemonic for the menu item, if any. For read-only controls, any static text associated with the control is displayed followed by the content of the control. For user-editable controls, only the text contained in the control is displayed.

The text viewer cursor implicitly follows the PC cursor, when active. However, if the user pans, the text viewer cursor is un-tethered from the PC cursor whereby the corresponding location of the string presented in the text viewer is no longer identified by the location of the PC cursor. A keystroke allows the user to route the PC cursor to the text viewer's current position.

Figure 6:
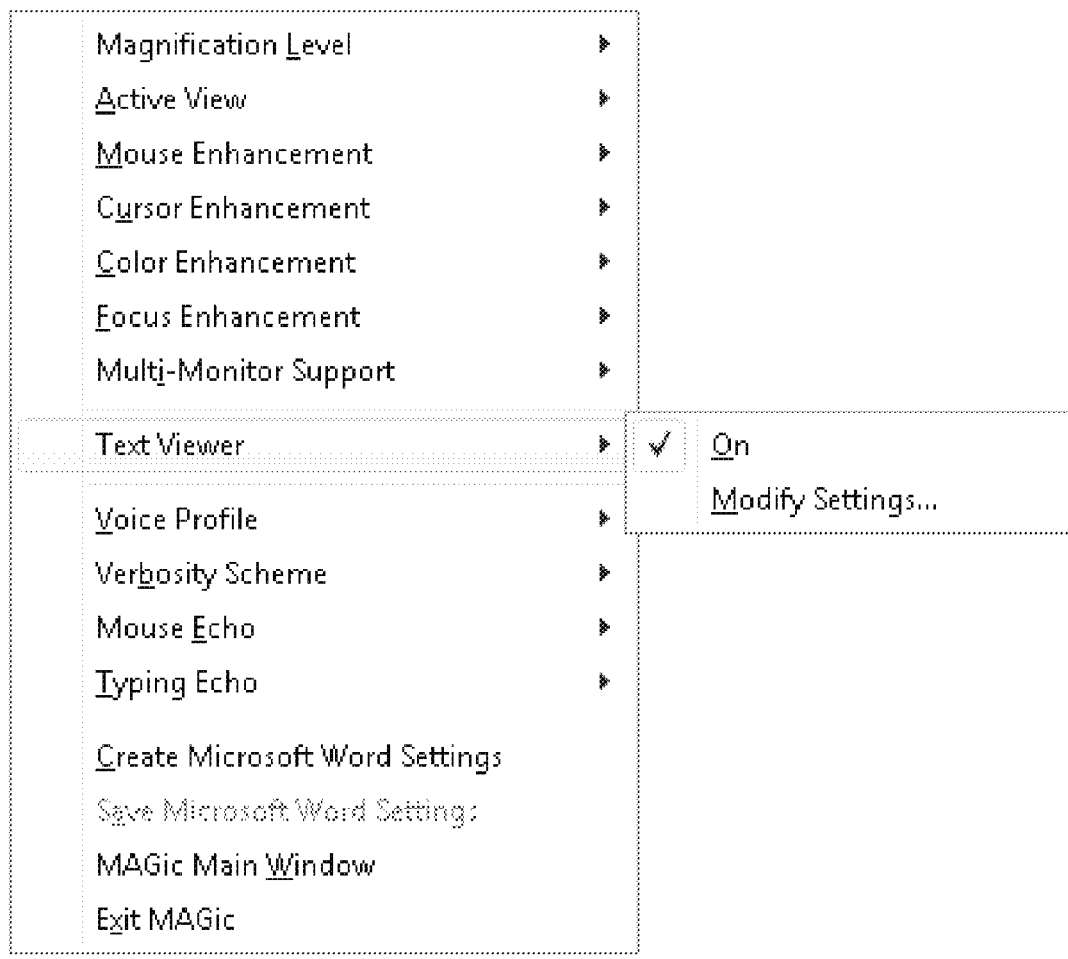
FIG. 6 is a GUI computer screen display pop-up menu according to an embodiment of the invention.
Figure 7:
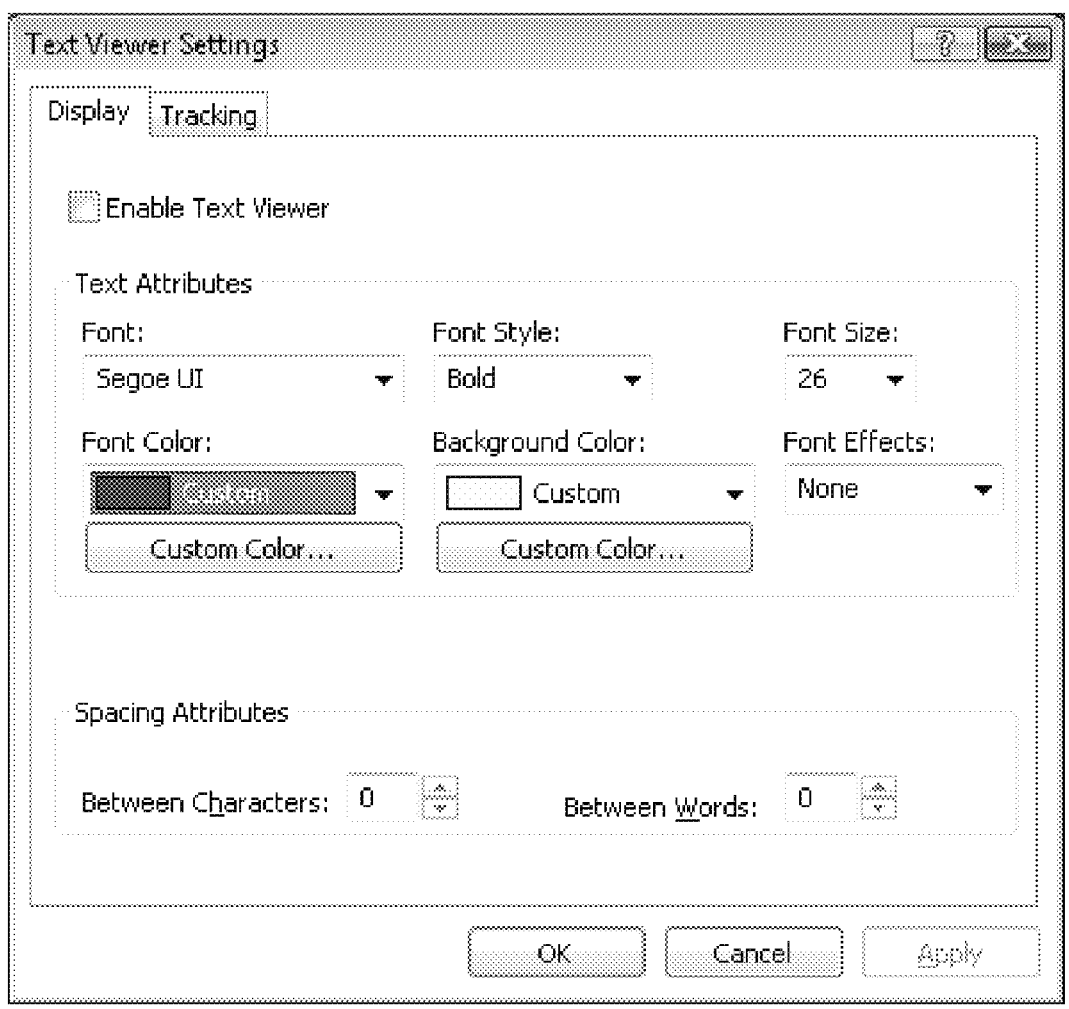
FIG. 7 is a GUI computer screen display dialog box according to an embodiment of the invention for setting text viewer display features.
Figure 9:
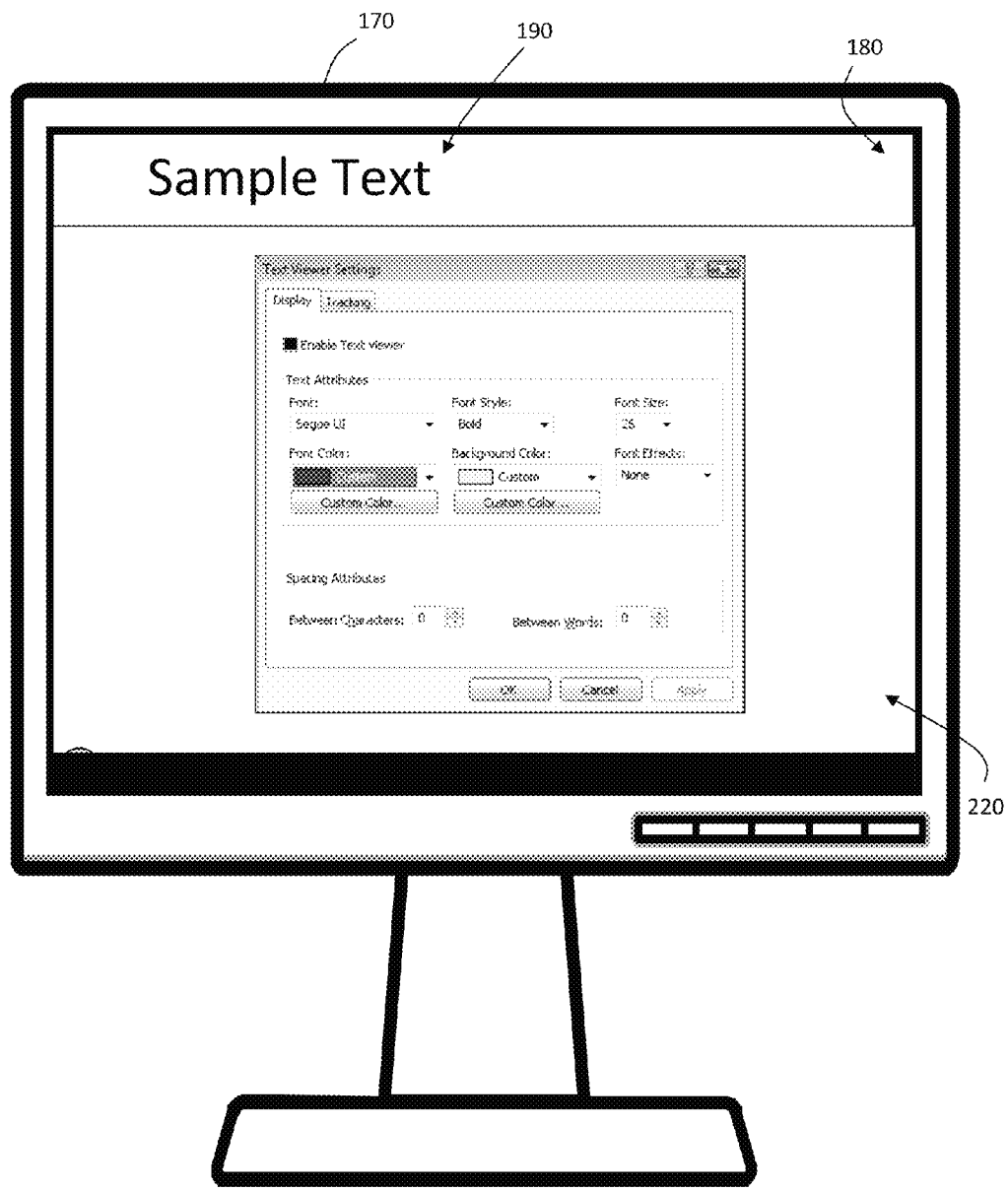
FIG. 9 is GUI computer screen display according to an embodiment of the invention showing a preview of sample text responsive to a settings dialog box being in focus.

In this illustrative embodiment, the user sets the properties of the text viewer through the magnification user interface. The settings property sheet is activated from a "text viewer settings . . ." menu item added under the Tools menu (FIG. 5) or may be invoked from a pop-up menu as shown in FIG. 6. When the settings dialog as shown in FIG. 7 is invoked, sample text is written to the text viewer (FIG. 9), such as the phrase "Sample Text." The cursor and spotlight indicators reflect their settings in the property sheet, thereby showing the user how they would normally appear when active (for example, spotlighting normally doesn't display until an automated "say" action). The cursor indicator is placed on the first letter of the first word of the sample text; the spotlight is placed around the first word of the sample text.

The property sheet will have standard OK, Cancel and Help buttons positioned at the bottom of the dialog. As the user makes changes to the controls the text viewer will dynamically update to reflect the current state of the values in the pages of the Settings Property Sheet. Pressing OK will save the new settings; Cancel will revert back to the text viewer settings prior to invoking the property sheet.

The top check box control in FIG. 7 toggles the text viewer on and off. When checked, the text viewer window will automatically appear above the desktop, and the desktop will be shifted downward and resized to accommodate the text viewer surface's screen real-estate.

The user can select any True Type font installed on their machine. The combo box's list is dynamically populated with only True Type fonts available on the system. The list is sorted alphabetically. The default is the currently selected system proportional font. The Font Style combo box contains entries for None and Bold. The default is None. The combo box contains common font sizes for the selected font and is user-editable. This setting determines the size of the text. The dialog provides a "Custom Color" button to allow users to select any mixture as a custom color. A sample of the color precedes the name of the color in the combo box. This setting determines the color of the background in the Text Viewer window. The combo box and "Custom Color" buttons behave as do those used for "Font Color". The user can set the text to appear in Small Caps, All Caps, or None (no effects) in a combo box. The user can adjust spacing between characters and spacing between words.

Figure 8:
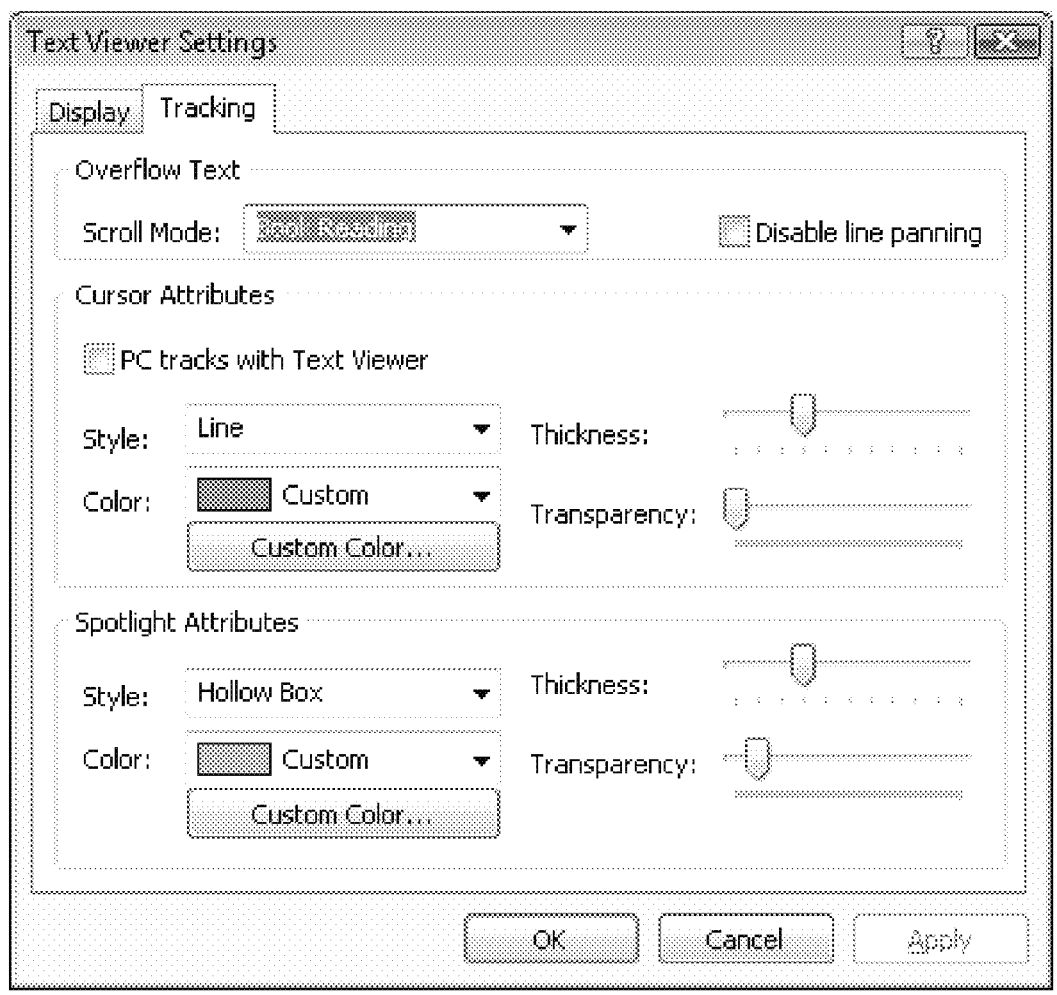
FIG. 8 is a GUI computer screen display dialog box according to an embodiment of the invention for setting text viewer tracking features.

In FIG. 8, the tracking settings for the text viewer of this embodiment are shown in a dialog box. The scroll mode setting determines text, cursor indicator, and spotlight scrolling behavior during automated speech and user panning. There are entries for "Book Reading" and "Ticker Tape". "Book Reading" is the default. The "Disable line panning" check box disables the user's ability to move to the next line of text via Text Viewer panning The check box for "PC tracks with text viewer" adjusts whether the PC cursor will follow the text viewer when the user pans the contents of the text viewer.

The cursor style dropdown list contains entries for Line, Box, and None. The default is line. The cursor indicator color setting determines the color of the cursor position indicator. The dialog provides a "Custom Color" button to allow users to select any mixture as a custom color. A sample of the color will precede the name of the color in the combo box. The slider control cursor indicator thickness is consistent with other thickness sliders found in MAGic®, and has a range of 2-12.

The cursor indicator can be made transparent. Its degree of transparency can be modified by a slider control. The value represents a percentage. Spotlighting appears when automated reading takes place, such as during a "Say All". When automated reading stops, the spotlight remains on the last spoken word until the user manually navigates or an event causes new text to be written to the viewer window. When the user is panning or navigating manually by keystroke, no spotlighting will appear in the GUI window. The style dropdown list contains entries for Solid Block, Hollow Box, Underline, and None. However, styles may include any predetermined geometric configuration such as circles, rectangles and the like. The spotlight color combo box provides a variety of color choices. This setting determines the color of the text. The dialog provides a "Custom Color" button to allow users to select any mixture as a custom color. A sample of the color will precede the name of the color in the combo box. The spotlight thickness combo box provides a range of line thicknesses. The user is able to set thickness values with values of 2 through 12. A sample of the line thickness will precede the value of the thickness in the combo box. The spotlight can be made transparent. Its degree of transparency can be modified by a slider control. The value represents a percentage.

In an embodiment of the invention, the text viewer is implemented as a separate process. Its modules are located under a subdirectory such as " . . . \Magic\12.0\UI\TextViewer". In a first iteration, the text viewer is implemented as a top-most window; in a second iteration it is implemented in the magnification engine as a magnification exclusion region, and the existing window will only be used for inter-process communications (IPC) via window messages. IPC exchanges data among multiple threads in one or more processes.

The text viewer settings dialog may be implemented within the context of the magnification software's user interface, with its resources located in the same resource files/headers as the other dialogs in the software. The speech engine interacts with the text viewer via window messages.

Panning support may be achieved by moving the PC cursor as needed to feed the text viewer additional text. Alternatively, the text viewer cursor may be driven by the text viewer's panning methods, through messaging. The text viewer receives whole-line notifications of text changes, and additionally will receive positional information relating to the current word spoken, or current PC cursor position.

For speech output, the spoken text may be shown verbatim, such as when walking through a plain document, or displaying the text resulting from a mouse-echo. Mouse-echo is a feature that reads text underneath a mouse pointer without the user having to down-click onto the text, icon or control. Mouse-echo is useful in navigating a control-rich GUI. However, variability may arise when screen reader cursor selections and "text under mouse" features are considered. There are likely instances where the system will decide to alter the displayed text from that which is fed to the synthesizer or to in some ways decorate and/or reduce the "current line of text." Returning to the example above, imagine of the user pointed at the operating system clock. The synthesizer may be fed a fully descriptive date and time, whereas the text the user is currently pointing at is only the "10:45 AM" shown in the taskbar tray. So the synthesizer might say "Monday, Jan. 10, 2010, 10:45 AM", whereas the text viewer will only display "10:45 AM". Generally speaking, there are two main reasons that the user's text viewer might show something other than what is spoken:

a. The choice of what to speak is alterable by the user in the screen reader's verbosity settings, and perhaps elsewhere. The text viewer in some cases therefore will need to be able to restrict itself to only what is "real" text on the screen, possibly a subset or wholly different that what the user has chosen to have spoken.
 b. In some cases, such as a tooltip on an icon, the mouse isn't really pointing to any text, just a picture. But because the screen reader is intelligent enough to realize that the text in the tooltip is related to what the user is currently pointing at, the text viewer shows the tooltip text even though the user isn't really pointing at any "real" text.

As a result, an embodiment of this feature focuses on speech and text derived from the PC cursor and output verbatim from the magnification software's mouse-echo speech. Other cursor-derived speech and special cases are anticipated by the present invention.

The magnification engine interacts with the text viewer via window messages. Communications to the magnification engine are "lazy", in that the text viewer process that makes requests of the magnification engine doesn't act on the request until successful acknowledgment of the request is received via window message from the magnification engine.

The core of the text viewer is an interface definition implemented by a concrete base class object that is responsible for maintaining a rendering surface, drawing area, and text rendering. Layered over the concrete object are decorators, implemented via the decorator pattern, that include: (1) cursor position indicator; (2) spotlight position indicator; (3) edge indicators; and (4) text source indicator.

There are four processes in the text viewer feature: (1) the speech engine (speech text, text source, and position related notifications); (2) the magnification engine (screen real-estate control); (3) the magnification user interface (text viewer settings dialog); and the (4) text viewer itself. All interaction between processes is via SendMessage or PostMessage. WM_COPYDATA is used to communicate settings and content; the main reasons for using the message queue instead of more direct IPC mechanisms are ease of implementation.

Messages sent to and from the text viewer may be "tick tagged" to prevent possible issues related to "stale" text modifier messages (e.g. spotlight position).

The speech engine includes two functions that post messages to the text viewer. These functions relate to the current line of text, the cursor source type, and the spotlight/cursor position information. The text viewer is a consumer of positional, textual, and contextual information from multiple sources, including the speech engine, the operating system, the magnification engine, and possibly others. Additionally, startup/shutdown/HWND communications mechanisms for speech engine-text viewer interaction are added to magnification and speech applications in a manner similar to those added for Braille viewers.

The magnification engine provides the following functionality relative to the text viewer:
 Allows the text viewer to create a magnification exclusion area, as defined by a RECT structure.
 Provides a handle to device context (HDC) upon which the text viewer can draw.
 The API may internally look something like this:
 BOOL CreateMagExcludeRect(RECT &rect, HDC &hDC);
 The rect is passed by reference from the magnification engine's message handler in case the magnification engine needs to adjust the rect. The magnification engine will then post a message to the requesting window handle with the resulting rect, and an HDC. The requesting process is responsible for adjusting itself to the rect and for testing the validity of the HDC.

The rect may be assumed to be top-left, full width across a single monitor (only the height is used); a rect is used for future enhancement. Any subsequent call to CreateExcludeRect changes the one and only rect.

In multi-monitor environments, the text viewer will need to maintain a collection of rendering instances, one per physical monitor. Multiple monitor support is implemented as a single, virtual desktop with the 0,0 coordinate being the top, left corner of the primary monitor. Monitors to the left are negative coordinates, originating from the right and progressing leftward; monitors to the right use a positive coordinate system. Each virtual instance of the text viewer and modifiers will need to completely recalculate their layout, font size, spotlight/cursor rendering positions etc. for each monitor. All non-primary monitor text viewer rendering will be based on user settings whose metrics are assumed to be based on the resolution and dimensions of the primary monitor.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of magnifying text across a computer operating system platform, the method comprising:
   loading a background text viewer process on a computer operating system, the background text viewer process having access to internal operating system messaging relating to text sent to a graphics display driver for presentation to an end-user on a GUI;
   drawing a text viewer on a portion of the GUI whereby the text viewer and a third party application that displays text are shown on the GUI concurrently;
   intercepting alphanumerical characters originating from the third party application and sent to the graphics display driver, the interception performed by the background text viewer process; and
   displaying the intercepted alphanumerical characters on the text viewer normalized according to end-user defined settings, wherein normalization includes transforming all intercepted alphanumerical characters at a uniform, user-defined font style and size.

2. The method of claim 1 further comprising a step of providing bi-directional synchronization of the end-user focus in the GUI and the intercepted text displayed on the text viewer whereby change in end-user focus in the GUI updates the text viewer and scrolling of the text viewer updates the location of the end-user focus in the GUI.

3. The method of claim 2 further comprising a step of providing a panning function, the panning function comprising the steps of:
   responsive to a first user input, uncoupling the bi-directional synchronization;
   panning across text displayed on the text viewer whereby the end-user focus in the GUI remains static; and
   responsive to a second user input, recoupling the bi-directional synchronization.

4. The method of claim 3 further comprising a step of restricting panning to a single line of text in the GUI.

5. The method of claim 1 further comprising the step of:
   establishing a desktop region separate from the text viewer, the desktop region displaying operating system elements and third-party applications subject to end-user specified magnification while the text viewer remains unmagnified.

6. The method of claim 5 wherein the text viewer is resized according to end-user specified font attributes of the text displayed therein.

7. The method of claim 1 further comprising a text source graphic displayed within the text viewer, the text source graphic indicating the source of the end-user focus resulting in the current line of text displayed within the text viewer.

8. The method of claim 7 wherein the end-user focus is selected from a group consisting of cursor position, caret position, screen reader position, Braille reader position, and text viewer position.

9. The method of claim 1 further comprising the step of displaying directional indicia on the text viewer to indicate to the end user that additional text is available off screen.

10. The method of claim 1 wherein the intercepted text is displayed on the text viewer in book reading mode.

11. The method of claim 1 wherein the intercepted text is displayed on the text viewer in ticker tape mode.

12. The method of claim 11 wherein the ticker tape mode is selected from a group consisting of flowing, centered, right and single word.

13. The method of claim 1 further comprising the step of automatically scrolling text in the GUI to the text viewer responsive to a user-input event.

14. The method of claim 1 further comprising the steps of detecting a language of the intercepted text; and orienting the text viewer in a horizontal configuration for languages read on a horizontal plane and orienting the text viewer in a vertical configuration for languages read on a vertical plane.

15. A non-transitory computer-readable medium having stored thereon a program which is executable by a processor, the program comprising instructions for:
   loading a background text viewer process on a computer operating system, the background text viewer process having access to internal operating system messaging relating to text sent to a graphics display driver for presentation to an end-user on a GUI;
   drawing a text viewer on a portion of the GUI whereby the text viewer and a third party application that displays text are shown on the GUI concurrently;
   intercepting alphanumerical characters originating from the third party application and sent to the graphics display driver, the interception performed by the background text viewer process; and
   displaying the intercepted alphanumerical characters on the text viewer normalized according to end-user defined settings, wherein normalization includes transforming all intercepted alphanumerical characters at a uniform, user-defined font style and size.

16. The non-transitory computer-readable medium of claim 15 further comprising an instruction for providing bi-directional synchronization of the end-user focus in the GUI and the intercepted text displayed on the text viewer whereby change in end-user focus in the GUI updates the text viewer and scrolling of the text viewer updates the location of the end-user focus in the GUI.

17. The non-transitory computer-readable medium of claim 16 further comprising an instruction for providing a panning function, the panning function comprising steps of:
   responsive to a first user input, uncoupling the bi-directional synchronization;
   panning across text displayed on the text viewer whereby the end-user focus in the GUI remains static; and
   responsive to a second user input, recoupling the bi-directional synchronization.

18. The non-transitory computer-readable medium of claim 15 further comprising an instruction for establishing a desktop region separate from the text viewer, the desktop region displaying operating system elements and third-party applications subject to end-user specified magnification while the text viewer remains unmagnified.

19. The non-transitory computer-readable medium of claim 15 further comprising an instruction for orienting the text viewer in a horizontal configuration for languages read on a horizontal plane and oriented the text viewer in a vertical configuration for languages read on a vertical plane.

* * * * *